May 24, 1938.  W. VAN B. ROBERTS  2,118,109
RADIO CLOCK
Filed Nov. 28, 1934  2 Sheets-Sheet 1
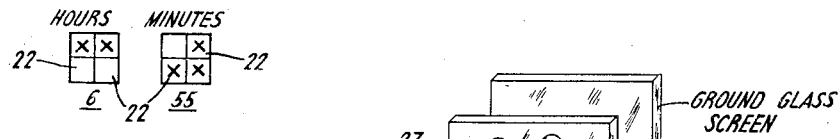
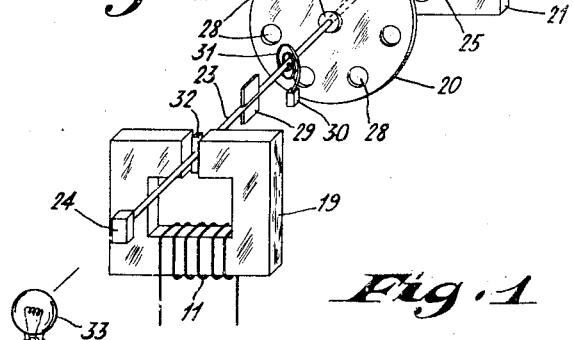
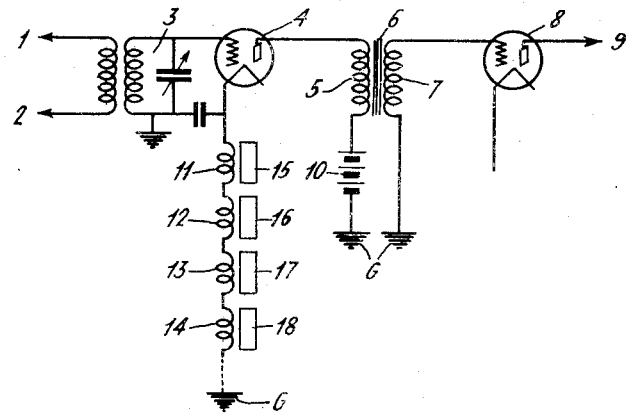
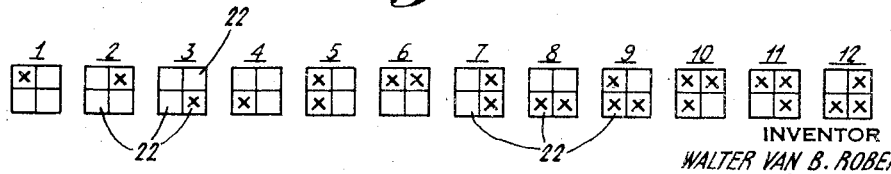
INVENTOR
WALTER VAN B. ROBERTS
BY
ATTORNEY

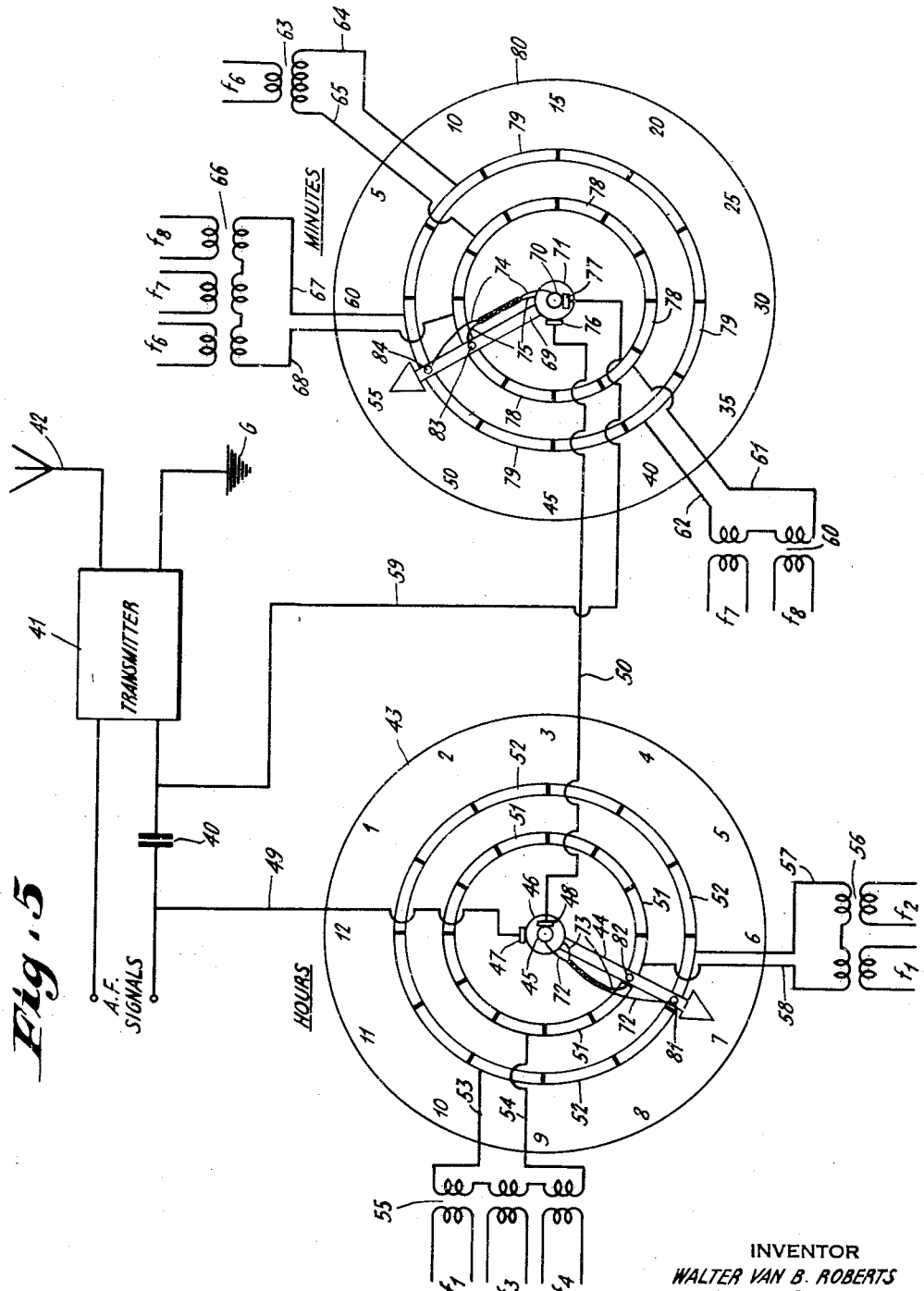

Patented May 24, 1938

2,118,109

UNITED STATES PATENT OFFICE 2,118,109

RADIO CLOCK

Walter van Braam Roberts, Princeton, N. J., assignor to Radio Corporation of America, a corporation of Delaware Application November 28, 1934, Serial No. 755,170

1 Claim. (Cl. 250—9)

The present invention relates to an electrical communication system and more particularly to a time signalling system.

Briefly, the present invention contemplates the transmission of a plurality of selectable auxiliary signals along with the usual program broadcast from a transmitting station, the auxiliary signals being utilized at a receiving point to indicate in some suitable manner the time of day.

In accordance with the invention the broadcasting station is supplied with an accurate clock which controls the auxiliary signal modulation of the carrier wave in accordance with the clock reading, it being understood that the carrier wave is also modulated by the audio signal energy desired to be transmitted. The modulations may be amplitude, frequency or phase. The time modulation requires only a narrow band of frequencies so that it may easily be located in the subaudible region. At the receiver the time wave or time signal in the rectifier output is utilized to operate indicating means by observation of which the customer may learn the correct time.

A possible form of the invention and one that will be described herein in detail, consists in generating at a transmitting point eight different auxiliary frequencies. Four of these are used in different combinations to indicate the hours of the day and the other four frequencies are used to indicate the twelve five minute intervals of each hour. At the receiving end there are provided eight vibrating reed mechanisms each responsive to one of the eight frequencies generated at the transmitter. Each vibrating reed mechanism comprises an arrangement whereby when the reed is excited which will be upon receipt of energy of a frequency corresponding to the frequency of the reed, a beam of light is allowed to pass from a suitable source to a screen, thus illuminating the screen.

Objects and the various features of the invention will be apparent from the following detailed description of a preferred form of the invention when read in connection with the drawings.

In the drawings:

Figure 1 illustrates in schematic form a portion of a receiving circuit incorporating the present invention;

Figure 2 is an expanded view of the mechanism associated with one of the vibrating reeds;

Figure 3 is a chart used to explain the various frequency designations of the invention;

Figure 4 illustrates one form of indicator which may be used at the receiver; and Figure 5 illustrates in schematic form the circuit connections of a transmitter which sends out signals in accordance with the invention.

In Figure 1, an electronic tube 4 which may be an amplifier and/or a detector is provided with an input circuit including the tunable circuit 3 and an output circuit. The output circuit comprises a connection between the anode of the tube 4 and ground G including the primary 5 of transformer 6 and a source of anode current 10 as well as a connection between ground G and the cathode of tube 4 including a series of windings 11—14 it being understood that there are as many of said windings as there are different auxiliary frequencies utilized. The signal energy input to the tube 4 is through the terminals 1 and 2. Transformer 6 is provided with a secondary 7 which forms part of the input circuit of an amplifier tube 8. The output of tube 8 is fed through terminal 9 to a suitable utilizing circuit as for instance the loud speaker of a radio receiver.

Each winding 11—14 has associated with it a vibrating reed assembly 15—18. Reference is now directed to Fig. 2 which shows one of the vibrating reed assemblies. In Figure 2 winding 11 which corresponds to winding 11 of Fig. 1 is wound around a magnetic core 19. The core is shaped so that the north and south poles thereof are in close proximity thus assuring a gap between them in which there is a strong magnetic field. A reed 32 preferably permanently magnetized is mounted within the gap by means of a shaft 23. The shaft 23 is mounted for rotation on suitable bearings 24 and 25. In addition to the reed 32 the shaft has fixed thereon at 26 a disc 20 which is provided with a plurality of apertures 28. A spring 31 is provided and arranged so that one end is connected to shaft 23 while the other end is fixed to a stationary portion of the assembly 30. The spring acts to control the to and fro motion of the shaft 23 in much the same manner as the balance wheel assembly of a watch. The movable system is adjusted so as to be tuned or to have a natural period equal to one of the auxiliary frequencies, thus when this particular frequency traverses coil 11, shaft 23 through the action of the core 19 and reed 32 will start to vibrate to and fro. Vibration of the shaft will also cause the perforated disc 20 to vibrate. In order to insure that the system cease to vibrate when the related auxiliary frequency ceases to flow through winding 11 there is provided an air paddle wheel frictional device 29 which is mounted on shaft 23 and acts as a braking means.

The mechanism thus far described is interposed between a source of light 33 and a ground glass screen 22 it being understood that a suitable casing is provided for the mechanism, the casing being arranged so that light can reach the screen 22 only through the apertures 28 in disc 20. Since it is desired to have light reach screen 22 only when the system is vibrating, a mask 21 is interposed between disc 20 and screen 22. Mask 21 is provided with a series of apertures 27 which are positioned on the mask with relation to the apertures 28 on disc 20 so that light can not pass through from source 33 to the screen 22 when the vibrating system is at rest it being understood that spring 31 determines the position of rest of the system. When the system is vibrating however the apertures 28 register with the apertures 27 during part of the cycle thus allowing light to pass through to screen 22.

As previously stated eight vibrating mechanisms like that shown in Fig. 2 are necessary to tell time within the nearest five minutes, four being necessary to indicate the hour and four to indicate twelfths of an hour or each five minute period in the hour. One of the many ways the eight mechanisms may be arranged is shown in Fig. 4 where four of the screens 22 indicate hours while the other four indicate minutes. The mechanisms are preferably placed within the receivers so that the screens 22 are visible through suitable apertures in the control panel of the set. The X in some of the screens 22 of Fig. 4 indicate that those particular screens are illuminated due to the vibration of the associated mechanisms.

Following out the chart shown in Fig. 3, it will be seen that the lighted windows in Fig. 4 indicate that the time is somewhere between 6:55 and 7:00 o'clock. This may be deduced from the chart shown in Fig. 3, wherein it will be noted that the two top screens or windows lighted indicates six while the two lower and the top right hand windows lighted indicates the twelfth five minute period. Since the six is under the "hours" set of screens we immediately deduce it is the 6th hour, whereas, the twelve indication being under the "minutes" set of screens means that we are in the twelfth five minute period of the hour. Since we have chosen to tell time to the nearest five minutes it follows at once that the "radio" clock read 6:55.

The choice of five minute intervals has been made solely to simplify the explanation of the invention and the apparatus requirements. It should be understood that by utilizing a greater number of auxiliary frequencies the correct time to the minute and even to the second is feasible.

One way in which the time signals may be transmitted along with the usual signal modulations is shown in Figure 5, wherein a master clock is arranged to modulate the carrier wave of the transmitter with the eight auxiliary frequencies $f_1$—$f_8$.

In Figure 5, an ordinary transmitter is shown generally at 41 the output of which is impressed upon antenna 42. The usual ground connection is shown at G. The input side of the transmitter includes the usual source of audio frequency signals which may be a microphone circuit not shown. There is also provided a condenser 40 across which are impressed the time signals or auxiliary frequencies. A master clock is provided for controlling the energy which is impressed across the condenser 40. For convenience in explaining the invention the master clock is shown as comprising an hour face 43 and a minute face 80 although it should be understood that a single face clock may be employed. The hour hand 44 is provided with two brushes 81 and 82 which make sliding contact with conducting rings 52 and 51 respectively. The rings are divided into twelve segments as shown and each segment is insulated from the adjacent segment. The shaft that carries the hour hand 44 has also mounted thereon in any suitable manner the two slip rings 45 and 46 with which cooperate brushes 48 and 47 respectively. Brush 47 is connected to the left hand side of condenser 40 by means of a conductor 49. It will be noted that the segmental divisions of rings 51 and 52 correspond to the hours of the day. The two segments corresponding to each hour are arranged so that the proper auxiliary frequencies may be impressed across them. For the sake of clearness only two such arrangements have been shown in connection with the hour face and these are for the 6th hour and for the 9th hour. In the case of the 6th hour it will be seen from Figure 3 that two different frequencies must be employed to indicate six. Assuming that the four frequencies used in various combinations for representing the hours are $f_1$, $f_2$, $f_3$ and $f_4$, it will be seen from Figure 3 that $f_1$ and $f_2$ represent the 6th hour.

The 9th hour requires three frequencies, namely, $f_1$, $f_3$ and $f_4$. In the system shown the various frequencies corresponding to the hours are constantly impressed across the respective segments, so that the hour hand as it sweeps around the face of the clock picks up these frequencies through the brushes 81 and 82.

Brush 81 is connected by means of a conductor 72 to the slip ring 45 while brush 82 is connected to slip ring 46 through a conductor 73.

Substantially the same arrangement is used to indicate the twelve five minute intervals of each hour. Thus referring to Figure 5 there is provided the minute face 80 having the conducting rings 78 and 79. The minute hand 69 is provided with brushes 83 and 84 which contact with rings 78 and 79 respectively. Attached to the minute hand shaft are the two slip rings 70 and 71 which cooperate, respectively, with the brushes 77 and 76. Brushes 48 and 76 are connected together by means of conductor 50 while the brush 77 is connected through the medium of a conductor 59 to the right hand side of the condenser 40. The outer slip ring 71 is connected by a conductor 75 to the brush 83 while the inner slip ring 70 is connected to brush 84 by means of conductor 74.

As in the case of the hour dial, the showing of the minute dial is simplified by the fact that only three of the five minute interval auxiliary frequency impressing circuits are shown. These three circuits are the intervals between the 5th and 10th minute, the interval between the 35th and 40th minute and the interval between the 55th and 60th minute of the hour. Following out the chart shown in Figure 3 and assuming that frequencies $f_5$, $f_6$, $f_7$ and $f_8$ are to be utilized for indicating the minutes it will be seen that the second five minute period requires only one frequency, namely $f_6$, while the eighth five minute period requires two frequencies, namely, $f_7$ and $f_8$. The twelfth five minute period of the hour requires three frequencies, namely, $f_6$, $f_7$ and $f_8$. The various frequencies of both the hours and minutes are impressed in series across the condenser 40 and transmitted through antenna 42.

While this invention has been disclosed in a particular form, it is to be understood that it is capable of embodiment in other forms without departing from the spirit and scope of the appended claim.

What I claim is:

In a signalling system wherein carrier energy is modulated by desired signal energy representing one item of information and transmitted for reception at a distant point, means for transmitting additional signal energy representing another item of information on the same carrier energy comprising, means for additionally modulating the carrier energy by a group of one or more frequencies corresponding to the additional information to be transmitted, a receiving device having a detector and including means for separating the signal modulations and the additional modulations, utilizing means energized by the additional modulations comprising a plurality of devices for selectively responding to the said group of one or more frequencies, means for indicating the complexion of the frequencies selected comprising a plurality of mechanical vibratory systems each thereof being tuned to one of the frequencies arranged to be utilized for the transmission of the additional signals, each of the vibratory systems being arranged to be occult to a source of light when the system is not energized but to allow intermittent passage of light when in vibration, separate driving means associated with each vibratory system, said driving means being rendered operative only upon reception of the particular frequency to which the driving means is responsive, each of said vibratory systems comprising a vibrating reed assembly including an electromagnet shaped so that the poles thereof are in close proximity to each other and form a gap, a reed and a shaft, said reed being mounted on the shaft so that the reed is positioned within the gap, a disc mounted on said shaft, said disc being provided with a plurality of apertures, means to control the vibrations of the shaft, a screen, a mask interposed between said disc and said screen, said mask being provided with a series of apertures positioned on the mask in relation to the apertures on the disc so that light from the source cannot pass through to the screen when the vibrating system is at rest but may intermittently pass through the apertures to the screen when the vibrating system is vibrated.

WALTER van BRAAM ROBERTS.